March 14, 1961 P. G. FIELDING ET AL 2,974,904
CONTROL MEANS FOR A BLOWING AIRFLOW OVER A CONTROL SURFACE
Filed Dec. 15, 1958 2 Sheets-Sheet 1
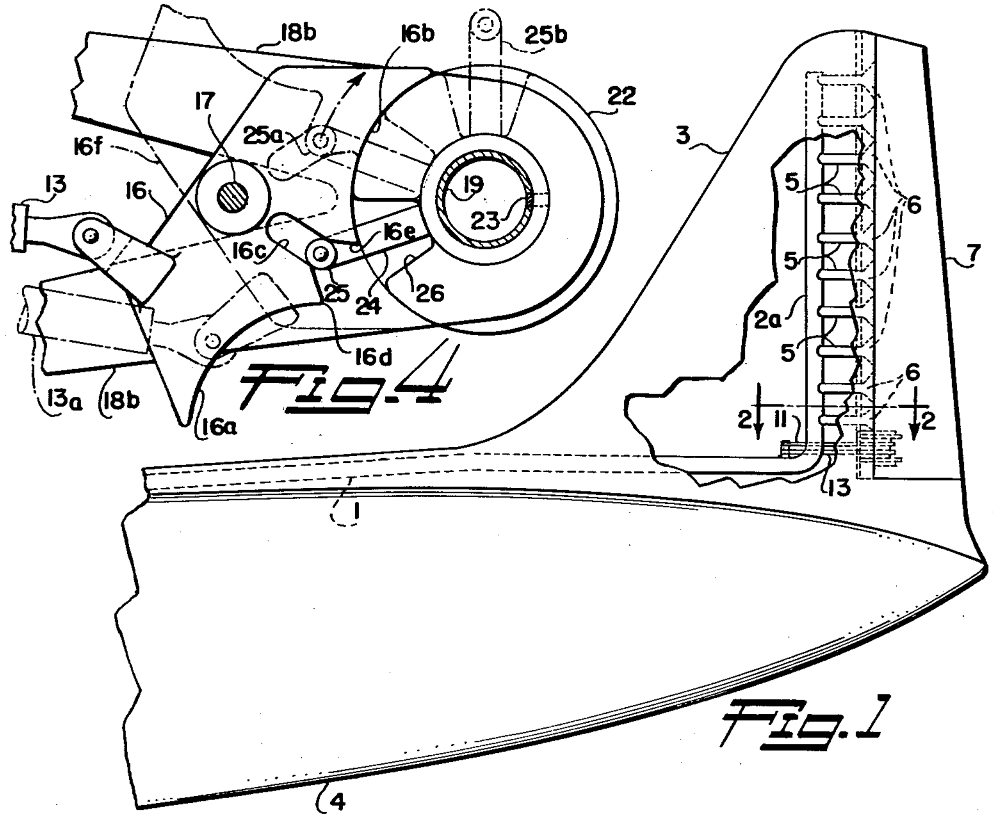
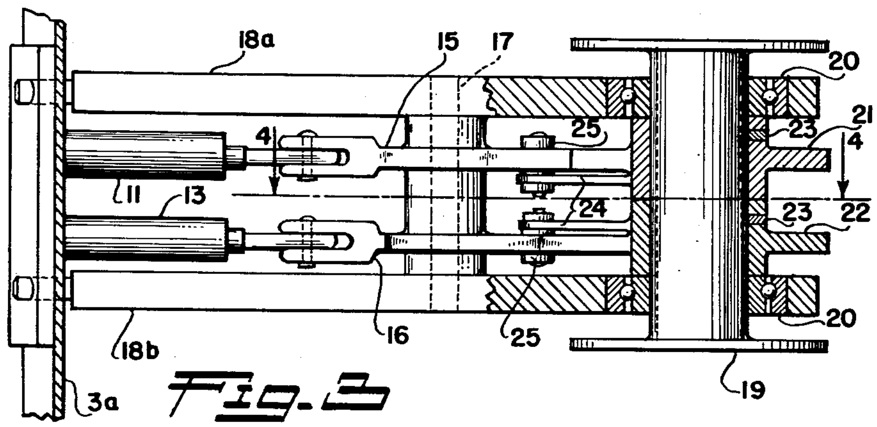
INVENTORS
PETER G. FIELDING
WILFRED C. J. GARRARD
JAMES M. NORMAN
By George A. Sullivan
Agent CONTROL MEANS FOR A BLOWING AIRFLOW OVER A CONTROL SURFACE
Filed Dec. 15, 1958
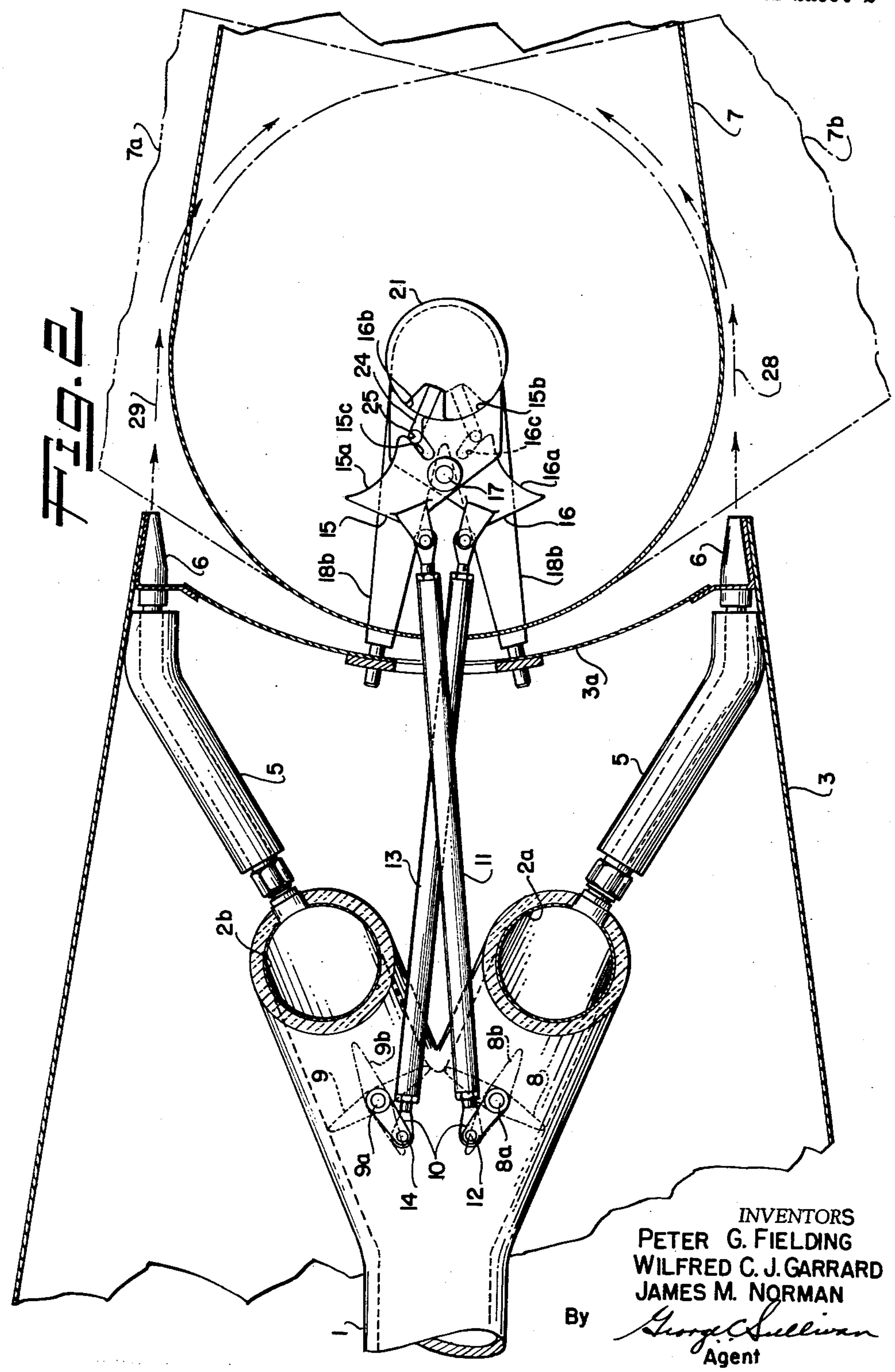
INVENTORS
PETER G. FIELDING
WILFRED C. J. GARRARD
JAMES M. NORMAN
By George C. Sullivan
Agent United States Patent Office 2,974,904

Patented Mar. 14, 1961

2,974,904

CONTROL MEANS FOR A BLOWING AIRFLOW OVER A CONTROL SURFACE

Peter Goodwin Fielding, Claremont, Calif., and Wilfred Charles James Garrard, Marietta, and James Monroe Norman, Atlanta, Ga., assignors to Lockheed Aircraft Corporation, Burbank, Calif.

Filed Dec. 15, 1958, Ser. No. 780,284

5 Claims. (Cl. 244—42)

This invention concerns a blowing or boundary layer airflow over a control surface, and more particularly a blowing or boundary layer airflow over either of the opposite sides of a movable control surface depending on which direction the control surface is deflected relative to a stationary airfoil.

It is known that employment of a positive efflux or blowing of a boundary layer airflow over the top surface of a high lift device movable relative to a fixed airfoil, such as flaps, when extended, results in increased aerodynamic lift. This increased lift is accomplished due to such effects as:

(1) The lift curve slope of the airfoil is increased to near the full theoretical value;

(2) Boundary layer separation on the airfoil is prevented at speeds up to and in excess of the maximum take-off and landing speeds;

(3) The vertical component of the jet reaction increases the lift directly; and (4) The phenomenon of supercirculation, or pressure lift increases the lift, such being accomplished due to the result of the pressure discontinuity at the trailing edge of the flap.

The increased lift due to wing flaps through the above effects permits the aircraft to fly at substantially lower airspeed. The reduced speed of the aircraft when flaps are extended in turn causes a compatible reduction of airspeed over conventional control surfaces, such as the rudder, elevators, etc., and hence, a consequent reduction in the effectiveness of such control surfaces. By supplying a blowing airflow over conventional control surfaces during low speed conditions control effectiveness on the aircraft can be increased as well as can large control surface deflections be permitted without loss of aircraft control effectiveness. Furthermore, the above advantages can be further enhanced by supplying a blowing airflow to either side of a movable control surface, as well as by varying the amount of blowing airflow to either side of the control surface; both occurring in a differential manner relative to and controlled by the direction of deflection or movement of the control surface. Such enhancement of aircraft control effectiveness at low speeds is accomplished by the above listed effects for a blowing boundary layer airflow.

Accordingly, it is an object of this invention to provide increased control effectiveness of aircraft movable control surfaces by almost three times for the same relative true air speeds.

A further object of this invention is to provide lowered minimum aircraft take-off and landing speeds where maneuverability can be effected by movable control surfaces on the aircraft.

A still further object of this invention is to provide a control means for directing a blowing airflow over either side of an aircraft movable control surface, the side having a flow thereover depending upon the direction of control surface deflection.

Another object of this invention is to provide a control means for varying a blowing airflow over either side of an aircraft movable control surface, the amount of blowing depending upon the amount of control surface deflection.

It is still a further object of this invention to provide a control means for directing a varying blowing airflow over either side of an aircraft movable control surface automatically in response to a deflection or movement of the control surface.

Other objects and advantages will become apparent from the following description taken in connection with the accompanying drawings in which:

Figure 1 is an elevational view of an aircraft vertical stabilizer and rudder with a portion of the outer skin of the vertical stabilizer removed for purposes of clarity to show the distribution of blowing air nozzles in one embodiment of this invention;

Figure 2 is an enlarged detailed view of the invention embodiment in Figure 1 taken along line 2—2 of Figure 1;

Figure 3 is a partial cross-sectional view showing details of the mounting of the valve operating rods and actuating cams to the rudder structure of the invention embodiment shown in Figures 1 and 2; and Figure 4 is a view taken along line 4—4 of Figure 3.

Generally stated, the shown embodiment of the invention is practiced by a bifurcated duct arrangement supplying pressurized air to a plurality of nozzles on each side of an aircraft rudder for blowing an airflow over either side of the rudder. The side of the rudder over which the airflow is blown is dependent upon the direction of rudder deflection, and is controlled by a butterfly valve located in each branch of the bifurcated pressurized air supply duct arrangement. Actuation of the valves is transmitted from cam arrangements with the rudder post through linkages to the valves. Thus, deflection of the rudder relative to the fixed vertical stabilizer will open the duct arrangement valve on the side opposite that toward which the rudder is deflected to permit a controlled blowing airflow over one surface of the rudder thereby increasing the control effectiveness thereof due to the effects as listed above. By permitting larger control surface deflection in conjunction with the boundary layer blowing airflow, beneficial aerodynamic results attainable are:

(1) Significant increase of control surface effectiveness at large deflections;

(2) Achievement of adequate controllable maneuverability at low flight speeds; and (3) Accomplishment of a reduction of the minimum flight speed of the aircraft permitting taking the advantages of low stalling speeds of the aircraft obtainable with a boundary layer control system on the flaps.

More specifically, referring to Figures 1 and 2, a main duct 1 supplies pressurized air from any appropriate source (not shown) to both bifurcated supply duct branches **2*a* and 2*b* located substantially vertical in vertical stabilizer 3 of aircraft 4**. It is to be understood that the pressurized air source may be any of a variety of means on an aircraft such as bleed air from a turbo powerplant, pneumatic compressor, etc., and it is intended that no specific means of pressurized air supply on the aircraft is to form a limitation thereof.

A plurality of lateral duct or tube members 5 connects bifurcated branches **2*a* and 2*b* with a plurality of nozzles 6 located vertically along both sides of the fixed vertical stabilizer airfoil 3 or aircraft 4. The plurality of nozzles 6 on each side of vertical stabilizer 3 are fixedly arranged to discharge a flow of air over one surface of movable control surface rudder 7**, which is pivotally mounted longitudinally along the trailing edge of vertical stabilizer 3 to allow rotational deflection of rudder 7 relative to vertical stabilizer 3 through the usual type of aircraft controls for effecting movement of movable control surfaces, such controls and method of mounting the rudder to the vertical stabilizer not being shown as they form no part of this invention and are unnecessary for an understanding of this invention.

Referring now more particularly to Figures 2, 3 and 4, the bifurcated branches 2*a* and 2*b* contain butterfly type valves 8 and 9 respectively, which are pivotally mounted on shafts 8*a* and 9*a* respectively. A crank 10 is connected securely to each of the shafts 8*a* and 9*a*, the crank 10 that is connected to shaft 8*a* in turn being pivotally connected to a rod 11 as indicated at connection 12, while the crank 10 connected to shaft 9*a* is pivotally connected to rod 13 as indicated at connection 14. The rods 11 and 13 are in turn pivotally connected to cams 15 and 16 respectively, which in turn are each pivotally mounted on a pin 17 secured by parallel support members 18*a* and 18*b* that are rigidly secured at one end to adjacent member 3*a* of vertical stabilizer 3 by any appropriate means. The support members 18*a* and 18*b* are in turn supported around a sleeve 19 by roller bearings 20. Sleeve 19 is mounted on the hinge line or pivot axis of rudder 7 and is connected thereto by any appropriate means so as to rotate with rudder 7 as it is deflected relative to the vertical stabilizer 3; the support members 18*a* and 18*b* remaining stationary by virtue of roller bearings 20 relative to rotation of sleeve 19 by deflection of rudder 7.

Mounted on sleeve 19 between roller bearings 20 are face plate members 21 and 22, both of which are secured to sleeve 19 to rotate therewith such as by pins 23. Each of the face plate members 21 and 22 has a radial extending arm 24 on which is mounted a cam follower roller means 25. The cams 15 and 16 each have two concave surfaces 15*a* and 15*b* and 16*a* and 16*b* respectively, all of which are shaped to mate with the respective peripheral surfaces of face plate members 21 and 22. Between the two concave surfaces on each of the cams 15 and 16 is a guide slot 15*c* and 16*c* respectively, in which rides the respective roller 25 for each cam 15 and 16 during rotative actuation of the cams 15 and 16 around pin 17. As the arms 24 and rollers 25 are rotated with sleeve 19 as the rudder 7 is deflected relative to vertical stabilizer 3, the action of each of the rollers 25 in their respective slots 15*c* and 16*c* cause the respective cams 15 and 16 to rotate about their fixed pivot pin 17 held by support members 18*a* and 18*b* so as to open one of the butterfly valves 8 or 9, depending upon the direction of deflection of rudder 7 relative to vertical stabilizer 3.

Referring specifically to Figure 4, face plate 22 has an arcuate radial cutout 26, the radial centerline of which is located parallel to the centerline of arm 24. This cutout 26 permits clearance of portions or tips 16*d* and 16*e* of cam 16 with face plate 22 as cam 16 is rotated about pivot pin 17 by roller 25 on the surface of cutout 16*c* as roller 25 rotates with sleeve 19 and face plate 22 when rudder 7 is deflected. It is to be understood face plate 21 has a cutout similar to cutout 26 for clearance purposes with cam 15.

As rotation of sleeve 19 and face plate 22 is made in a clockwise direction as viewed in Figure 4, arm 24 and roller 25 also rotate clockwise and cause cam 16 to rotate counterclockwise around pin 17 so as to rotate cam surface 16*b* away from face plate 22 and cam surface 16*a* towards face plate 22, thereby pulling rod 13 toward the rudder and opening valve 9 in bifurcated branch 2*b*. Cam 16 will then be in the position indicated by phantom lines 16*f*, rod 13 to phantomed position 13*a*, and roller 25 to phantomed position 25*a*. Further clockwise rotation of sleeve 19 and face plate 22 will withdraw roller 25 from guide slot 16*c* towards phantomed position 25*b* and cam 16 will maintain the position of 16*f* as the mating of cam surface 16*a* and face plate 22 will prevent further rotation of cam 16. It is to be understood that cooperation between face plate 21 and cam 15 occurs exactly as discussed above, only in opposite directions as rudder 7 and sleeve 19 are deflected and rotated in a counterclockwise direction.

During flight operation of the aircraft, when the rudder is in a neutral position as seen by position 7 in Figure 2, both valves 8 and 9 are closed and there is no blowing airflow over either side or surface of rudder 7. As rudder 7 is rotated counterclockwise, as viewed in Figure 2, towards position 7*a*, the roller 25 in slot 15*c* of cam 15 forces cam 15 to rotate clockwise about pin 17, cam surface 15*b* swinging away from face plate 21 while cam surface 15*a* swings towards face plate 21. This rotation of cam 15 about pin 17 causes rod 11 to move away from and open valve 8 by the rotation of crank 10 about the axis of shaft 8*a*. The arrangement shown provides for valve 8 to begin opening at approximately 10° deflection of rudder 7 towards position 7*a*, with valve 8 reaching its full open position 8*b* at approximately 30° deflection of rudder 7 towards position 7*a*. Such opening of valve 8 causes a blowing airflow over one side or surface of rudder 7 as indicated by arrows 28. At the point of 30° deflection of rudder 7, cam surface 15*a* will be in full mating contact with the periphery of face plate 21 preventing further rotation of cam 15 about pin 17, and any further counterclockwise deflection of rudder 7 towards position 7*a* will move roller 25 out of slot 15*c*. During this counterclockwise deflection of rudder 7 towards position 7*a*, valve 9 stays closed as such rotation has caused roller 25 on face plate 22 to rotate counterclockwise out of slot 16*c* of cam 16, and cam 16 is prevented from rotation around pin 17 by the full mating contact of cam surface 16*b* with the periphery of face plate 22.

The exact reversal of the above events takes place on the clockwise deflection of rudder 7 from position 7*a* to a neutral position. Further clockwise deflection of rudder 7 past its neutral position towards position 7*b* will cause actuation of cam 16 to rotate around pin 17 to open valve 9 to position 9*b* causing a blowing airflow over the other side or surface of rudder 7 as indicated by arrows 29. Also, such opening of valve 9 occurs while cam 15 remains stationary and valve 8 closed.

Thus it can be seen there is provided an automatic control for delivering a blowing airflow over one of the surfaces of a movable control surface, depending upon which direction the control surface is deflected relative to its fixed airfoil member. Furthermore, such airflow is modulated as the valve affected by rudder deflection in either direction is moved gradually from the point of closure to full opening, whereupon further deflection of rudder 7 will be at a steady state flow of blowing air.

It is to be understood that changes in the positions of valves 8 and 9 and the deflection of the movable control surface may be accomplished by changes in the valves 8 and 9, the cranks 10, rods 11 and 13, cams 15 and 16, face plates 21 and 22, arms 24, and rollers 25, as required for satisfactory operation of the aircraft.

While a particular embodiment of the invention has been illustrated and described, it will be obvious to those skilled in the art that various changes and modifications may be made without departure from the invention and it is intended to cover in the appended claims all such modifications and equivalents as fall within the true spirit and scope of this invention.

What is claimed is:

1. Means for increasing effectiveness of a movable control surface extending longitudinally adjacent the trailing edge of a fixed aerodynamic airfoil and pivotally deflectable relative to the airfoil comprising, a pressurized air discharge means in the airfoil for discharging blowing airflow over either side of said control surface, valve means in said air discharge means controlling when a blowing airflow is directed to a side of the control surface, and means controlling said valve means, said control means responsive to deflections of the control surface in both directions from a neutral position to effect upon deflection a blowing airflow over the side of the deflected control surface opposite the direction of deflection, said control means further responsive to return of the control surface to neutral position for stopping the airflow.

2. A device for effecting a blowing airflow over a movable aerodynamic control surface upon deflection from neutral position comprising, a fixed airfoil having a movable control surface extending longitudinally along a portion of the trailing edge thereof, a duct arrangement having bifurcated branches at one end and connected to a source of pressurized air at the other end, said branches extending longitudinally in the fixed airfoil adjacent the trailing edge portion on each side thereof and substantially parallel to said movable control surface, a valve means in each of the branches, fluid discharge means in conjunction with each of the branches for discharging pressurized air from the source over one side of the movable control surface when the valve in that branch is open, and a control means connected to both of said valve means in the branches, said control means responsive to a deflection of the movable control surface in either direction from a neutral position relative to the fixed airfoil to effect a blowing airflow on the side of the deflected control surface opposite the direction of deflection, said control means further responsive to return of the control surface to neutral position for closing the branch valve means opened by the control means upon deflection of the control surface.

3. A device for effecting a blowing airflow over a movable aerodynamic control surface when deflected from neutral position comprising, a fixed airfoil having a movable control surface extending longitudinally along a portion of the trailing edge thereof, a duct arrangement having bifurcated branches at one end and connected to a source of pressurized air at the other end, said branches extending longitudinally in the fixed airfoil adjacent the trailing edge portion on each side thereof and substantially parallel to said movable control surface, a valve means in each of the branches, fluid discharge means in conjunction with each of the branches for discharging pressurized air from the source over one side of the movable control surface when the valve in that branch is open, a pair of cam members pivotally mounted on a fixed shaft independently of each other, means connecting each of said valves with one of said cams independently of other said valve and cam, and cam actuating means mounted in conjunction with the movable control surface, said cam actuating means pivotally actuating one of said cams about its fixed shaft to open the branch valve connected thereto for effecting a blowing airflow over one side of the movable control surface when deflected in one direction from a neutral position while the other said cam and valve remain stationary and closed, said other cam and valve actuated and opened when the movable control surface is deflected in the other direction from neutral position effecting a blowing airflow on the other movable control surface side while first said cam and valve remain stationary and closed.

4. A device for effecting a blowing airflow over a movable aerodynamic control surface when deflected from neutral position comprising, a fixed airfoil having a movable control surface extending longitudinally along a portion of the trailing edge thereof, a duct arrangement having bifurcated branches at one end and connected to a source of pressurized air at the other end, said branches extending longitudinally in the fixed air foil adjacent the trailing edge portion of each side thereof and substantially parallel to said movable control surface, a valve means in each of the branches, fluid discharge means in conjunction with each of the branches for discharging pressurized air from the source over one side of the movable control surface when the valve in that branch is open, a pair of cam members pivotally mounted on a fixed shaft independently of each other and each having a pair of peripheral concave surfaces with a guide slot extending radially inward from the periphery between said surfaces, means connecting each of the valves with one of said cams independently of other said valve and cam, a pair of juxtoposed cam face plates mounted in conjunction with the movable control surface for relative rotation therewith as the movable control surface is deflected, and a radial extending arm and roller means on each of said face plates, said members arranged such that when the movable control surface is in a neutral position each roller means is at the peripheral portion of the guide slot in its respective cam member while one of the cam concave surfaces of each cam is is peripheral contact with the cam face plate its respective roller means is connected to, said members cooperating whereby deflection of the movable control surface in one direction from a neutral position results in one of the cams to rotate about its fixed shaft to open the branch valve connected thereto effecting a blowing airflow on one side of the movable control surface while the roller means in the other said cam guide slot rotates out of the slot and the other said cam and valve remain stationary and closed, said other cam and valve actuated and opened when the movable control surface is deflected in the other direction from neutral position effecting a blowing airflow on the other movable control surface side while first and said cam and valve remain stationary and closed.

5. A means for increasing effectiveness of a movable control surface extending longitudinally adjacent the trailing edge of a fixed aerodynamic airfoil and pivotally deflectable relative to the airfoil as claimed in claim 1 including means in the valve control means responsive to the amount of movable control surface deflection from a neutral position for controlling the extent of valve opening thereby modulating the amount of blowing airflow with the extent of movable control surface deflection.

References Cited in the file of this patent

UNITED STATES PATENTS

| | | |
|---|---|---|
| 2,372,030 | Stalker | Mar. 20, 1945 |
| 2,478,793 | Trey | Aug. 9, 1949 |
| 2,840,323 | Hood | June 24, 1958 |
| 2,840,324 | Smith | June 24, 1958 |